US012766979B2

(12) United States Patent
Jonasson et al.

(10) Patent No.: US 12,766,979 B2
(45) Date of Patent: Oct. 20, 2026

(54) METHOD OF CONTROLLING A PROPULSION SYSTEM

(71) Applicant: Volvo Truck Corporation, Gothenburg (SE)

(72) Inventors: Mats Jonasson, Partille (SE); Sachin Janardhanan, Hisings Kärra (SE); Leo Laine, Gothenburg (SE); Esteban Gelso, Västra Frölunda (SE); José Vilca, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 41 days.

(21) Appl. No.: 18/873,909

(22) PCT Filed: Jun. 23, 2022

(86) PCT No.: PCT/EP2022/067106
§ 371 (c)(1),
(2) Date: Dec. 11, 2024

(87) PCT Pub. No.: WO2023/247035
PCT Pub. Date: Dec. 28, 2023

(65) Prior Publication Data
US 2025/0360802 A1 Nov. 27, 2025

(51) Int. Cl.
*B60L 15/20* (2006.01)

(52) U.S. Cl.
CPC ....... *B60L 15/2045* (2013.01); *B60L 2200/36* (2013.01); *B60L 2220/42* (2013.01); (Continued)

(58) Field of Classification Search
CPC ............. B60L 15/2045; B60L 2200/36; B60L 2220/42; B60L 2240/12; B60L 2240/421; (Continued)

(56) References Cited

U.S. PATENT DOCUMENTS 5,374,877 A 12/1994 Imaseki et al.
2015/0298574 A1* 10/2015 Bramson ............. B60L 15/2054 701/22
(Continued)

FOREIGN PATENT DOCUMENTS

CN 104859486 A * 8/2015
CN 109532513 A 3/2019

OTHER PUBLICATIONS

International Search Report and Written Opinion for International Patent Application No. PCT/EP2022067106, mailed Feb. 14, 2023, 16 pages.
(Continued)

*Primary Examiner* — Anne Marie Antonucci
*Assistant Examiner* — Misa H Nguyen
(74) *Attorney, Agent, or Firm* — Withrow & Terranova, PLLC

(57) ABSTRACT

A method of controlling a vehicle propulsion system comprising at least two motion support devices, wherein each motion support device comprises an actuator configured to apply a torque on at least one wheel of a vehicle during propulsion and to generate electric power during braking. A lumped efficiency value for the actuators is determined based on an aggregated mechanical power level at a previous point in time, an aggregated electrical power level at the previous point in time, and an estimated actuator torque distribution between the actuators, whereby a power distribution for the actuators is allocated based on the lumped efficiency value and a torque request, and control signal is transmitted to each of the at least two motion support devices to control the respective actuator based on the allocated power distribution.

9 Claims, 4 Drawing Sheets

(52) U.S. Cl.
CPC ..... *B60L 2240/12* (2013.01); *B60L 2240/421* (2013.01); *B60L 2240/423* (2013.01); *B60L 2240/486* (2013.01); *B60L 2240/549* (2013.01)

(58) Field of Classification Search
CPC ......... B60L 2240/423; B60L 2240/486; B60L 2240/549; B60L 2240/14
See application file for complete search history.

(56) References Cited

U.S. PATENT DOCUMENTS

| | | | | |
|---|---|---|---|---|
| 2019/0023153 | A1* | 1/2019 | Vallbracht | B60L 15/34 |
| 2020/0262299 | A1* | 8/2020 | Ronning | B60L 15/2045 |

OTHER PUBLICATIONS

Written Opinion for International Patent Application No. PCT/EP2022067106, mailed Dec. 19, 2023, 8 pages.
International Preliminary Report on Patentability for International Patent Application No. PCT/EP2022067106, mailed Oct. 4, 2024, 44 pages.

* cited by examiner

METHOD OF CONTROLLING A PROPULSION SYSTEM

PRIORITY APPLICATIONS

This application is a 35 USC 371 national phase filing of International Application No. PCT/EP2022/067106, filed Jun. 23, 2022, the disclosure of which is incorporated herein by reference in its entirety.

TECHNICAL FIELD

The present invention relates to a vehicle propulsion system. In particular, the invention relates to a method of controlling a vehicle propulsion system comprising at least two motion support devices, wherein each motion support device comprises an actuator. The invention also relates to a vehicle motion management system connectable to at least two motion support devices. Although the invention will mainly be directed to a vehicle in the form of a truck, the invention may also be applicable for other types of vehicles comprising motion support devices with actuators for controlling propulsion and electric power generated braking, such as e.g., buses, working machines, trailers, and other transportation vehicles.

BACKGROUND

Electrified propulsion of passenger cars is becoming a conventional solution to reduce the environmental effect caused by vehicles. Heavy-duty vehicles, such as trucks, are also continuously developed to be able to provide electrified propulsion. The electrified propulsion system comprises one or more electric machines operable to generate a propulsion torque on one or more wheels of the vehicle.

The electrified heavy-duty vehicle preferably comprises multiple electric machines to propel the vehicle and to generate electric power during braking. The electric machines can be installed on the vehicle in different manners depending on the powertrain layout of the vehicle, such as e.g. centrally on the chassis, centrally on each drive axle, as wheel hub motor, etc. The electric machines may also each be connected to a gearbox, wherein the gear ratios for the different gearboxes can be the same or different compared to each other.

As such, the operating characteristics of the electric machines may thus be different depending on e.g. the normal load on the axles or wheels, electric machine type, size of the electric machine, gear ratios, etc., whereby the energy losses for the different electric machines differ.

In order to control operation of the various electric machine, an upper layer control functionality has been implemented. The upper layer control functionality receives feedback of current electric machine status and transmits demand signals for operation of the electric machines, based on various operating conditions.

However, in order to minimize energy usage of the electric machines, there is a desire to determine the overall energy losses in a sophisticated manner to optimize the usage of the electric machines during operation.

SUMMARY

It is thus an object of the present invention to at least partially overcome the above described deficiencies.

According to a first aspect, there is provided a method of controlling a vehicle propulsion system comprising at least two motion support devices, wherein each motion support device comprises an actuator configured to apply a torque on at least one wheel of a vehicle during propulsion and to generate electric power during braking, the vehicle propulsion system further comprising processing circuitry coupled to each of the at least two motion support devices, the method comprising determining, by the processing circuitry, an aggregated mechanical power level provided by the actuators of the at least two motion support devices at a previous point in time, the aggregated mechanical power level being based on an actuator rotational speed and an actuator torque of each actuator at the previous point in time; determining, by the processing circuitry, an aggregated electrical power level provided by the actuators of the at least two motion support devices at the previous point in time, the aggregated electrical power level being based on the actuator rotational speed, the actuator torque and an efficiency of each actuator at the previous point in time; determining, by the processing circuitry, a lumped efficiency value for the actuators of the at least two motion support devices, the lumped efficiency value being based on the aggregated mechanical power level at the previous point in time, the aggregated electrical power level at the previous point in time, and an estimated actuator torque distribution between the actuators of the at least two motion support devices; receiving, by the processing circuitry, a total torque request for the actuators of the at least two motion support devices at a current point in time; and allocating, by the processing circuitry, a power distribution for the actuators of the at least two motion support devices based on the lumped efficiency value and the torque request and transmit a control signal to each of the at least two motion support devices to control the respective actuator based on the allocated power distribution.

Each of the actuators described above preferably comprises an electric machine, or electric traction motor, for applying a torque on a wheel of the vehicle. The actuators may be arranged on a wheel axle for applying a torque on a pair of wheels, or arranged as a wheel hub actuator for applying a torque on a single wheel of the vehicle, etc. The motion support device should preferably be construed as a control system operatively controlling the respective actuator based on a received signal from e.g. an upper layer vehicle motion management system, as will be evident from the below disclosure.

Moreover, the aggregated mechanical power level provided by the actuators should be construed as the total mechanical power level provided by the actuators at the previous point in time, i.e. at a preceding time step. Put it differently, the aggregated mechanical power level can be seen as the sum of the mechanical power level provided by the actuators at the previous time step. In a similar vein, the aggregated electrical power level should be construed as the total electrical power provided by the actuators at the previous point in time, i.e. preceding time step. The aggregated electrical power level can be seen as the sum of the electrical power level provided by the actuators at the previous time step.

Further, the lumped efficiency value for the actuators should be construed as the overall efficiency of the actuators of the vehicle propulsion system. The inventors have realized that by determining a lumped efficiency value, or a lumped equivalent efficiency value based on the individual efficiencies and utilization, i.e. the mechanical and electrical power levels, of the actuators, efficient actuator requests can be formed in a subsequent time step, i.e. for an upcoming point in time when controlling operation of the actuators. Put it differently, the power distribution can be allocated in an efficient manner by previously having determined the overall efficiency of the vehicle propulsion system, i.e. the lumped efficiency. By determining the lumped efficiency value for the different actuators, an improved power management of the vehicle propulsion system can be provided at the upcoming point in time, without having knowledge of the details of the motion support devices.

According to an example embodiment, the estimated actuator torque distribution between the actuators of the at least two motion support devices may be an estimated torque distribution at the current point in time. The actuator torque distribution can hereby be estimated with substantial accuracy.

According to an example embodiment, the estimated actuator torque distribution between the actuators of the at least two motion support devices may be based on an aggregated actuator torque for the actuators of the at least two motion support devices at the previous point in time and a current vehicle speed.

The aggregated actuator torque should here be construed as the total torque obtained by the actuators of the vehicle propulsion system.

According to an example embodiment, each of the motion support devices may comprise a transmission receiving a torque from the actuator, the lumped efficiency being further based on a gear ratio provided by the transmission at the previous point in time. As briefly indicated above, the transmissions may have different gear ratio. An advantage is thus that the lumped efficiency value can be determined with still further accuracy when also obtaining the various gear ratios.

According to an example embodiment, the efficiency of each actuator at the previous point in time may be based on a rotational speed of the actuator and the actuator torque at the previous point in time. The efficiency is thus an indication of the rotational speed obtained by applying a specific torque.

According to an example embodiment, the aggregated mechanical power level and the aggregated electrical power level may be generated by the actuators during braking. During braking, the actuator thus generates electric power which can be fed to e.g. an energy storage system of the vehicle propulsion system. Hence, and according to an example embodiment, the vehicle propulsion system may further comprise an energy storage system configured to feed electric power to the actuators during propulsion and to receive electric power generated by the actuators during braking, wherein the allocated power distribution is based on a current capability level of the energy storage system.

According to an example embodiment, at least one of the motion support devices may comprise a foundation brake operable to apply a brake torque, the method further comprising comparing, by the processing circuitry, an electric power level generated by the actuators during braking with the current capability level of the energy storage system; and allocating, by the processing circuitry, the power distribution also to the foundation brake when the electric power level generated by the actuators exceeds the current capability level of the energy storage system.

Hereby, when e.g. a state of charge level of the energy storage system is above a predetermined threshold limit, of when the power level generated by the actuators during braking is higher than a power level limit of the energy storage system, the foundation brakes can be applied to reduce the braking operation of the actuators. Hereby, the actuators will generate less electric power. The energy storage system may thus be able to receive such lower power level generated by the actuators. By having determined the lumped efficiency, the overall capacity for the actuators as well as the energy storage system can be determined to be able to determine when, and to what extent, the foundation brakes should be operated. Put it differently, by knowing the lumped efficiency value, an indication can be given as to the power level flowing into and out from the energy storage system at the subsequent time step.

According to an example embodiment, each actuator may have a maximum torque capability, wherein the power distribution is allocated to not exceed the maximum torque capability for each of the actuators. Thus, a maximum limit is assigned when allocating the power distribution, thereby optimizing the power distribution at the subsequent time step.

According to a second aspect, there is provided a vehicle motion management system connectable to at least two motion support devices provided with an actuator configured to apply a torque on at least one wheel of a vehicle during propulsion and to generate electric power during braking, the motion management system being configured to receive a signal indicative of an aggregated mechanical power level provided by the actuators of the at least two motion support devices at a previous point in time, the aggregated mechanical power level being based on an actuator rotational speed and an actuator torque of each actuator at the previous point in time; receive a signal indicative of an aggregated electrical power level provided by the actuators of the at least two motion support devices at the previous point in time, the aggregated electrical power level being based on the actuator rotational speed, the actuator torque and an efficiency of each actuator at the previous point in time; determine a lumped efficiency value for the actuators of the at least two motion support devices, the lumped efficiency value being based on the aggregated mechanical power level at the previous point in time and, the aggregated electrical power level at the previous point in time, and an estimated actuator torque distribution between the actuators of the at least two motion support devices; receive a signal indicative of a total torque request for the actuators of the at least two motion support devices at a current point in time; and allocate a power distribution for the actuators of the at least two motion support devices based on the lumped efficiency value and the torque request and transmit a control signal to each of the at least two motion support devices to control the respective actuator based on the allocated power distribution.

The motion management system preferably comprises a control unit, or is arranged as a control unit. The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

Effects and features of the second aspect are largely analogous to those described above in relation to the first aspect.

According to a third aspect, there is provided a vehicle comprising a vehicle motion management system according to above described second aspect.

According to a fourth aspect, there is provided a computer program comprising program code means for performing the method of any one of the embodiments described above in relation to the first aspect when the program is run on a computer.

According to a fifth aspect, there is provided a non-transitory computer readable medium carrying a computer program comprising program code for performing the method of any one of the embodiments described above in relation to the first aspect when the program product is run on a computer.

According to a sixth aspect, there is provided a control unit for controlling an auxiliary system of a transportation vehicle, the control unit being configured to perform the method according to any one of the embodiments described above in relation to the first aspect.

Effects and features of the third, fourth, fifth and sixth aspects are largely analogous to those described above in relation to the first and second aspects.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

The above, as well as additional objects, features, and advantages, will be better understood through the following illustrative and non-limiting detailed description of exemplary embodiments, wherein.

DETAILED DESCRIPTION

Figure 1:
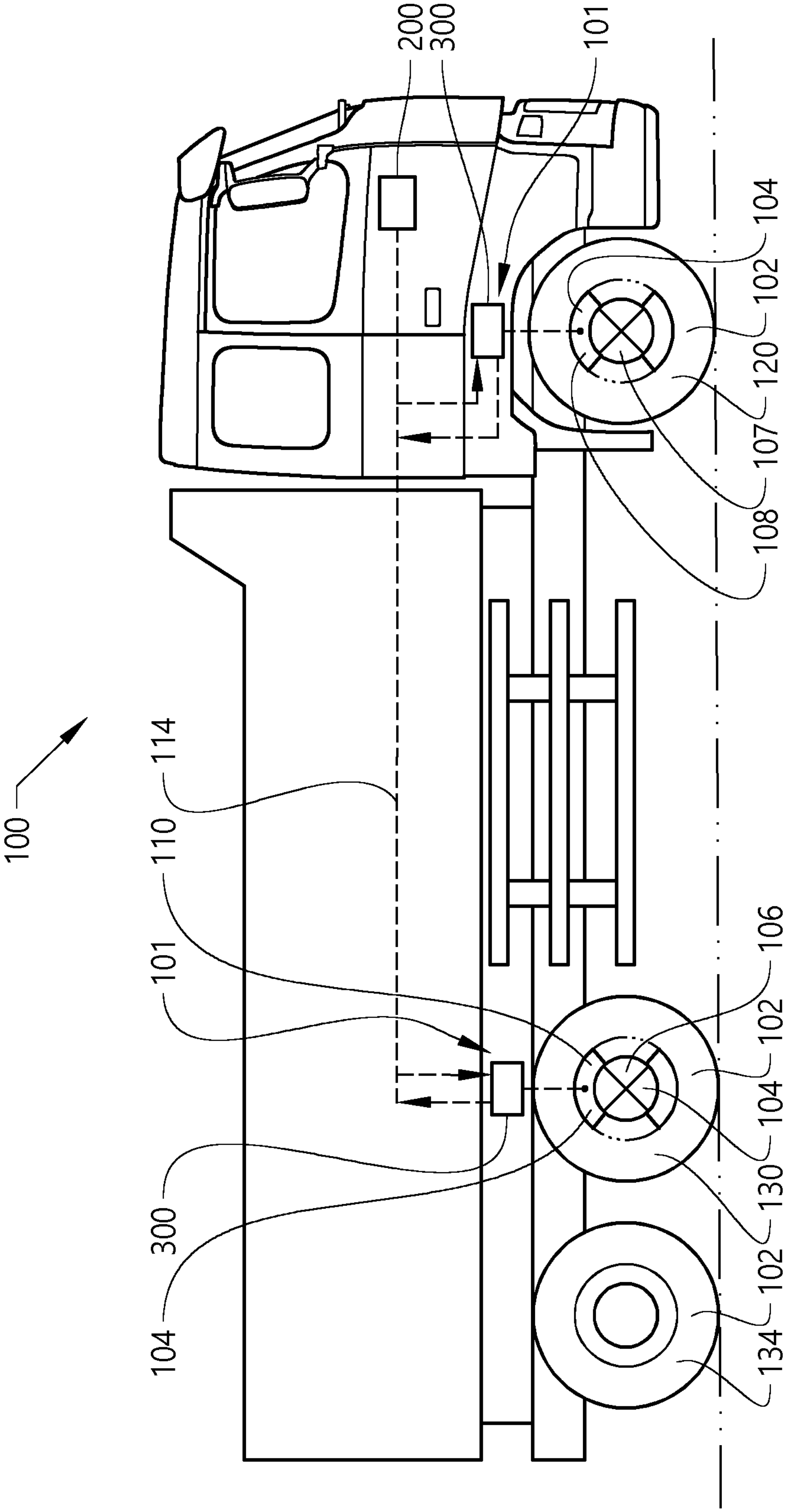
FIG. 1 is a lateral side view illustrating an example embodiment of a vehicle in the form of a truck.

The present invention will now be described more fully hereinafter with reference to the accompanying drawings, in which exemplary embodiments are shown. The invention may, however, be embodied in many different forms and should not be construed as limited to the embodiments set forth herein; rather, these embodiments are provided for thoroughness and completeness. Like reference character refer to like elements throughout the description.

With particular reference to FIG. 1, there is depicted a vehicle 100 in the form of a truck. The vehicle comprises a plurality of wheels 102. In particular, the vehicle 100 comprises a pair of front wheels 120 and a pair of rear wheels 130. The exemplified vehicle 100 also comprises a pair of wheels 134 arranged behind the pair of rear wheels 130, i.e. a pair of rearmost wheels 134. The following description will focus on describing the invention in relation to the pair of front wheels 120 and the pair of rear wheels 130, although the invention is applicable for actuators of the other wheels as well.

As exemplified in FIG. 1, the pair of front wheels 120 and the pair of rear wheels 130 each comprises at least one actuator 104. In particular, the pair of front wheels 120 comprises an actuator 104 in the form of an electric machine 107, as well as an actuator in the form of a foundation brake 108. The pair of rear wheels 130 also comprises an actuator 104 in the form of an electric machine 106 as well as an actuator in the form of a foundation brake 110. The electric machines 106, 107 are exemplified in FIG. 1 as being operable to apply a propulsion torque as well as a brake torque on their respective pair of wheels. As can be gleaned from FIG. 2, the electric machines 106, 107 are preferably connected to their respective pair of wheels via a differential coupling, i.e. a single electric machine is used for propelling and braking each pair of wheels. However, the invention is also applicable by the use of so-called wheel hub motors, wherein each wheel of the pair of wheels is provided with an individual electric machine for controlling propulsion and braking.

The electric machines 106, 107 are thus arranged to e.g. provide a tire force to the wheel(s) of the vehicle 100. The electric machines 106, 107 may be adapted to generate a propulsion torque as well as arranged in a regenerative braking mode for electrically charging a battery (not shown) or other energy storage system(s) of the vehicle 100. Electric machines may also generate braking torque without storing energy. For instance, brake resistors and the like may be used to dissipate the excess energy from the electric machines during braking.

Moreover, each of the actuators 104 is connected to a respective motion support device 300 arranged for controlling operation of the actuator 104. The motion support device 300 is preferably a decentralized motion support device 300, although centralized implementations are also possible. It is furthermore appreciated that some parts of the motion support system may be implemented with processing circuitry remote from the vehicle, such as on a remote server accessible from the vehicle via wireless link. Still further, each motion support device 300 is connected to a vehicle motion management system 200 of the vehicle 100 via a data bus communication arrangement 114 or the like. Hereby, control signals can be transmitted between the vehicle motion management system 200 and the motion support device 300. The motion support devices 300 depicted in FIG. 1 thus forms part of a vehicle propulsion system 101. The vehicle motion management system 200 will be described in further detail below with reference to FIG. 3.

The vehicle 100 optionally comprises a wireless communications transceiver arranged to establish a radio link to a wireless network comprising a remote server. This way the control unit may access the remote servers for uploading and downloading data. Notably, the vehicle 100 may store measurement data such as amounts of regenerated energy by the electric machines 106, 107 at various geographical locations along different vehicle routes in local memory or at the remote server. The vehicle motion management system 200 may also query the remote server for information about previously experienced amounts of regenerated energy, and/or temperature increases in various vehicle components along a given route.

The vehicle motion management system 200 may furthermore be arranged to obtain data indicative of an expected rolling resistance for a given route, either from manual configuration or remotely from the remote server. The rolling resistance of the vehicle 100 will affect the energy consumption of the vehicle as it traverses a route. For instance, a gravel road is likely to require more energy compared to a smoother asphalt freeway. Also, friction and air resistance will reduce the requirements on generating negative torque during downhill driving.

The vehicle motion management system 200 as well as the motion support device 300 may include a microprocessor, microcontroller, programmable digital signal processor or another programmable device. The systems may also, or instead, include an application specific integrated circuit, a programmable gate array or programmable array logic, a programmable logic device, or a digital signal processor. Where the system(s) include(s) a programmable device such as the microprocessor, microcontroller or programmable digital signal processor mentioned above, the processor may further include computer executable code that controls operation of the programmable device.

As indicated above, the vehicle motion management system 200 is configured to transmit control signals to the motion support devices 300. In further detail, a control allocator of the vehicle motion management system 200 determines a brake torque level to be applied by the various actuators 104 based on a torque request received by the vehicle motion management system 200 in order to obtain a desired braking action by the vehicle 100. Put it differently, the vehicle motion management system 200 determines actuator brake torque limits for each of the actuators 104, and based on the determined actuator brake torque limits, the control allocator determines an optimized brake torque distribution to generate a desired braking action while at the same time generate as much electric power as possible by energy recuperation of the electric machine 106. A signal is thereafter transmitted to each of the motion support devices 300, which signal is indicative of a torque level to be applied by the actuators of each motion support system 300. Further details of the allocation of power distribution will be given below with reference to FIG. 3.

Figure 2:
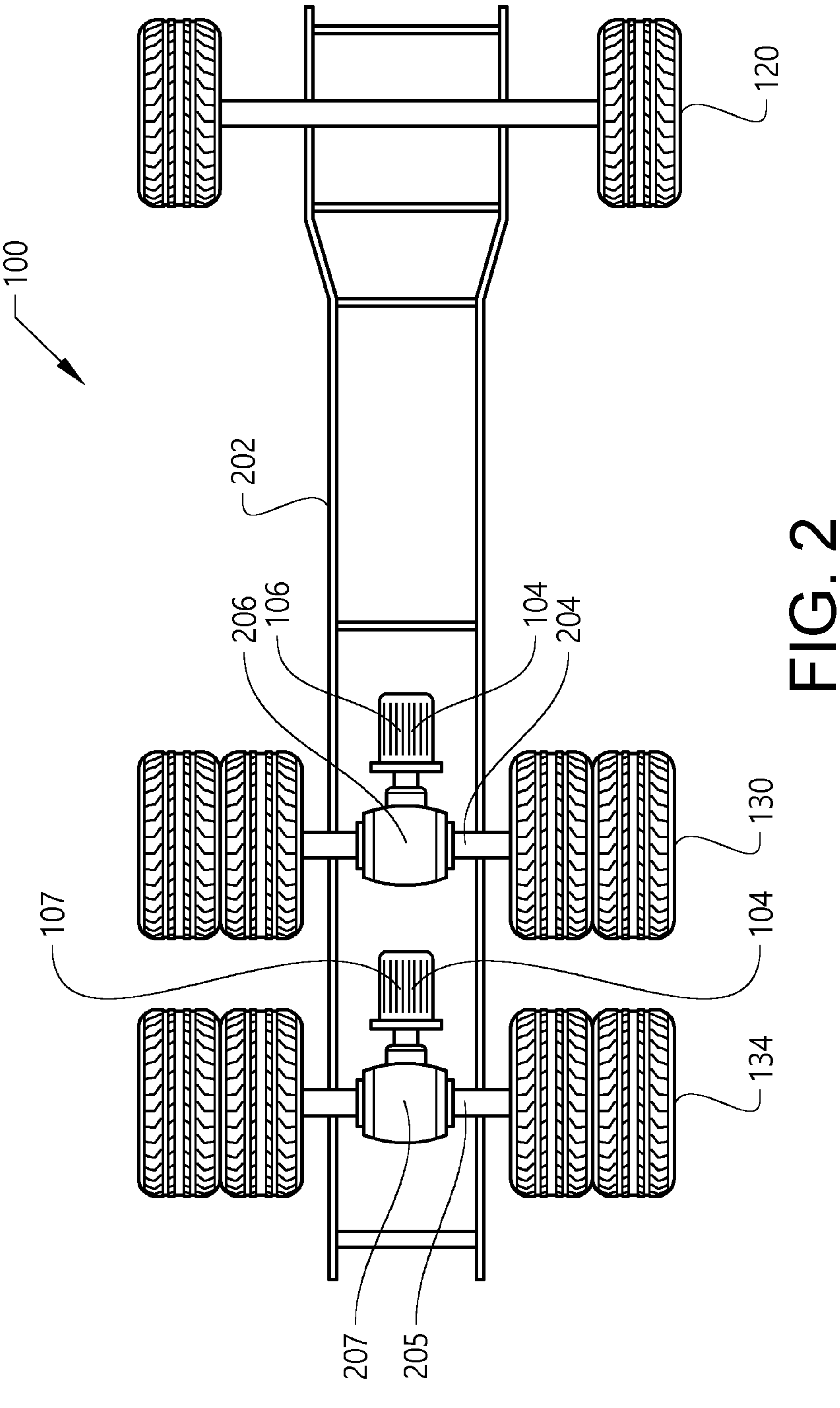
FIG. 2 is a schematic illustration of a vehicle propulsion system according to an example embodiment.

Turning to FIG. 2 which is a schematic illustration of an actuator configuration according to another example embodiment. As described above, the vehicle depicted in FIG. 1 comprises an electric machine 107 operatively connected to the pair of front wheels 120. In the exemplified vehicle in FIG. 2, the pair of rearmost wheels 134 is operatively connected an actuator 104 in the form of an electric machine 107. The rear pair of wheels 130 is still operatively connected to the electric machine 106 in a similar vein as exemplified in FIG. 1. The electric machines 106, 107 are installed centrally in the lateral direction on the chassis 202 and connected to their respective pair of wheels 130, 134 via a first 206 and second 207 transmission, respectively. The vehicle 100 may optionally also comprise a differential coupling (not shown) arranged between the respective transmission 206, 207 and the wheel axle 204, 205.

Figure 3:
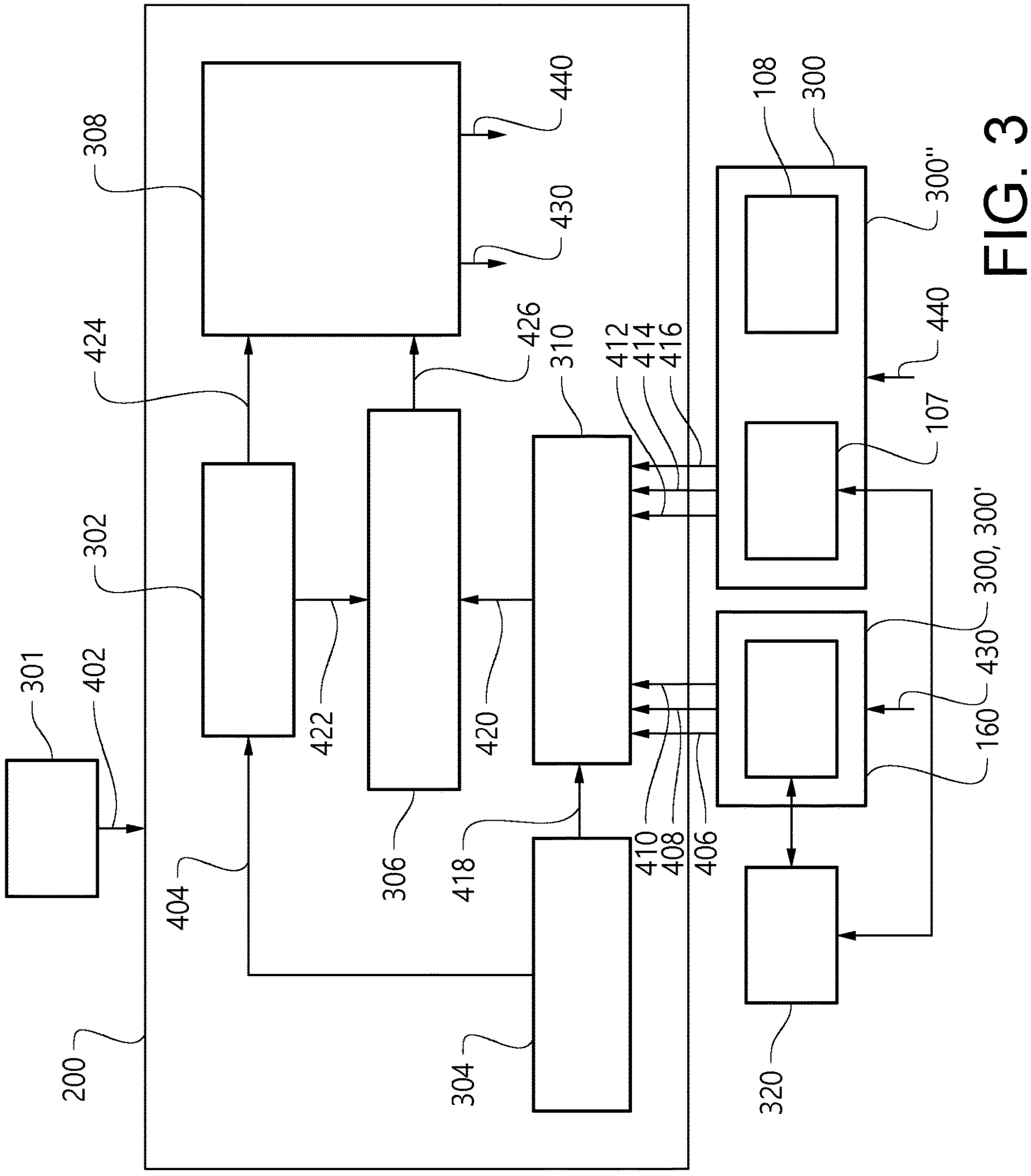
FIG. 3 is a schematic illustration of a vehicle motion management system according to an example embodiment.

Reference is now made to FIG. 3, which is a schematic illustration of the above mentioned vehicle motion management system according to an example embodiment. The vehicle motion management system 200 is coupled to a traffic situation management (TSM) 301. The TSM 301 is preferably a domain in a higher layer and operative to transmit a signal 402 indicative a requested acceleration, $a_{x,req}$, and a requested speed, $V_{x,req}$ to the vehicle motion management system 200. The TSM function plans driving operation with a time horizon of, e.g., 10 seconds or so. This time frame corresponds to, e.g., the time it takes for the vehicle to negotiate a curve. The vehicle maneuvers, planned and executed by the TSM, can be associated with acceleration profiles and curvature profiles which describe a desired vehicle velocity and turning for a given maneuver.

The vehicle motion management system 200 is also coupled to the motion support devices 300 described above. As can be seen, a first motion support device 300' comprises an actuator in the form of the above described electric machine 106, in the following referred to as the first electric machine 106, operatively connected to the rear pair of wheels 130. A second motion support device 300" comprises an actuator in the form of the above described electric machine 107, in the following referred to as the second electric machine 107' which is operatively connected to either the pair of front wheels 120 or the pair of rearmost wheels 134. The second motion support device 300" is also exemplified as comprising an actuator in the form of the above described foundation brake 108. Also, the vehicle comprises an energy storage system 320 operatively connected to the electric machines 106, 107 for feeding electric power to the electric machines during propulsion, and to receive electric power generated by the electric machines during braking.

The exemplified vehicle motion management system 200 comprises a motion prediction module 302, a motion estimation module 304, a power management module 306, a motion coordination module 308 and a lumped efficiency module 310. The motion prediction module 302 is configured to predict the motion of the vehicle 100 based on a signal 404 received from the motion estimation module 304. The motion estimation module 304 thus estimates the motion of the vehicle 100, preferably based on the signal 402 indicative of the requested acceleration, $a_{x,req}$, and a requested speed, $v_{x,req}$ received from the TSM 301. The signal 404 transmitted from the motion estimation module 304 to the motion prediction module 302 is thus indicative of an estimated motion of the vehicle based, at least in part, of the requested acceleration, $a_{x,req}$, and a requested speed, $v_{x,req}$.

The lumped efficiency module 310 is configured to determine a lumped efficiency value for the actuators 104 of the vehicle 100. As will be described in further detail below, the lumped efficiency module 310 receives from the first motion support device 300' a signal 406 indicative of a torque $T_{106}$ of the first electric machine 106 at a previous point in time, a signal 408 indicative of a rotational speed $\omega_{106}$ of the first electric machine 106 at the previous point in time, and a signal 410 indicative of an efficiency $\eta_{106}$ of the first electric machine 106 at the previous point in time. The lumped efficiency module 310 also receives from the second motion support device 300" a signal 412 indicative of a torque $T_{107}$ of the second electric machine 107 at the previous point in time, a signal 414 indicative of a rotational speed $\omega_{107}$ of the second electric machine 107 at the previous point in time, and a signal 410 indicative of an efficiency $\eta_{107}$ of the second electric machine 107 at the previous point in time. The lumped efficiency module 310 also receives a signal 418 indicative of an estimated longitudinal vehicle speed $v_x$ from the motion estimation module 304 and determines a lumped efficiency value. The lumped efficiency module 310 transmits a signal 420 indicative of the lumped efficiency $\eta_{lumped}$ to the power management module 306.

The power management module 306 also receives a signal 422 indicative of the predicted motion of the vehicle 100 from the motion prediction module 302. The power management module 306 monitors and controls electric power flow to/from the energy storage systems as well as the motion support devices. In further detail, the power management module 306 determines that a minimum and maximum input/output power from the energy storage system will fulfil a propulsion request, i.e. a torque request, of the actuators and their lumped efficiency values. Accordingly, based on the signal indicative of the predicted motion of the vehicle 100 from the motion prediction module 302, the power management module 306 determines the required minimum and maximum input/output power from the energy storage system to fulfil such propulsion request. The minimum and maximum input/output power from the energy storage system is thus determined based on the lumped efficiency for the actuators. The motion coordination module 308 receives a signal 424 indicative of the predicted motion of the vehicle 100 from the motion prediction module 302 as well as a signal 426 indicative of a power level/request of e.g. the energy storage system and the motion support devices from the power management module 306. The motion coordination module 308, based on the data comprised in the signals 424, 426 allocates a power distribution for the actuators which are transmitted to the first 300' and second 300" motion support devices. In particular, a first signal 430 indicative of a requested torque $T_{req,\ 106}$ is transmitted to the first motion support device 300' and a second signal 440 indicative of a requested torque $T_{req,\ 107}$ is transmitted to the second motion support device 300".

The following will now describe the operation of the vehicle and an example of determining the lumped efficiency $\eta_{lumped}$. For simplicity, the following will describe an operating scenario with only two motion support devices as depicted in FIG. 3, although the invention is equally applicable and can be extended to also include more than two motion support devices.

During operation of the vehicle 100, a torque distribution between the first 106 and second 107 electric machines can be estimated according to eq. (1).

$$\beta = \frac{T_{106}}{T_{107}} \tag{1}$$

An aggregated torque, i.e. a total torque for the first 106 and second 107 electric machines can be expressed according to eq. (2).

$$T_{tot} = i_{206}T_{106} + i_{207}T_{107} \tag{2}$$

Where $i_{206}$ is the gear ratio of the first transmission 206 and $i_{207}$ is the gear ratio of the second transmission 207.

By equations (1) and (2), the individual torque of the first 106 and second 107 electric machines at a previous point in time can be determined by equations (3) and (4) below.

$$T_{106} = \frac{\beta}{i_{206}\beta + i_{207}}T_{tot} \tag{3}$$

$$T_{107} = \frac{1}{i_{206}\beta + i_{207}}T_{tot} \tag{4}$$

An aggregated mechanical power level $P_{m,tot}$ of the first 106 and second 107 electric machines at the previous point in time can be determined by eq. (5).

$$P_{m,tot} = \omega_{106}T_{106} + \omega_{107}T_{107} \tag{5}$$

Where $\omega_{106}$ is the rotational speed of the first electric machine 106 at the previous point in time, and $\omega_{107}$ is the rotational speed of the first electric machine 106 at the previous point in time.

An aggregated electrical power level $P_{e,tot}$ of the first 106 and second 107 electric machines at the previous point in time can be determined by eq. (6).

$$P_{e,tot} = \frac{\omega_{106}T_{106}}{\eta_{106}(\omega_{106}, T_{106})} + \frac{\omega_{107}T_{107}}{\eta_{107}(\omega_{107}, T_{107})} \tag{6}$$

The efficiency $\eta_{106}$ is thus dependent on the rotational speed and torque of the first electric machine 106, and the efficiency $\eta_{107}$ is dependent on the rotational speed and torque of the second electric machine 107.

The lumped efficiency module 310 can determine the lumped efficiency $\eta_{lumped}$ according to eq. (7).

$$\eta_{lumped} = \frac{P_{m,tot}}{P_{e,tot}} \tag{7}$$

By using eq. (3)-(6) in eq. (7), the following expression can be obtained, see eq. (8).

$$\eta_{lumped} = \frac{P_{m,tot}}{P_{e,tot}} = \frac{\omega_{106}T_{106} + \omega_{107}T_{107}}{\frac{\omega_{106}T_{106}}{\eta_{106}(\omega_{106}, T_{106})} + \frac{\omega_{107}T_{107}}{\eta_{107}(\omega_{107}, T_{107})}} \tag{8}$$

Further reformulation of eq. (8) finally ends up in eq. (9) below.

$$\eta_{lumped} = \frac{\omega_{106}\beta + \omega_{107}}{\frac{\omega_{106}\beta}{\eta_{106}\left(\omega_{106}, \frac{\beta}{i_{106}\beta + i_{107}}T_{tot}\right)} + \frac{\omega_{107}}{\eta_{107}\left(\omega_{107}, \frac{1}{i_{106}\beta + i_{107}}T_{tot}\right)}} \tag{9}$$

By replacing electric machine speed of the first 106 and second 107 electric machines according to eq. (10) and eq. (11), where r is the wheel radius, the below defined eq. (12) can be formulated.

$$\omega_{106} = \frac{i_{106}v_x}{r} \tag{10}$$

$$\omega_{107} = \frac{i_{107}v_x}{r} \tag{11}$$

$$\eta_{lumped}(i_{106}, i_{107}, \beta, v_x, r, T_{tot}) = \frac{\frac{i_{106}v_x}{r}\beta + \frac{i_{107}v_x}{r}}{\frac{\frac{i_{106}v_x}{r}\beta}{\eta_{106}\left(\frac{i_{106}v_x}{r}, \frac{\beta}{i_{106}\beta + i_{107}}T_{tot}\right)} + \frac{\frac{i_{107}v_x}{r}}{\eta_{107}\left(\frac{i_{107}v_x}{r}, \frac{1}{i_{106}\beta + i_{107}}T_{tot}\right)}} \tag{12}$$

The torque distribution described above in relation to eq. (1) can be expressed as $\beta = f(v_x, T_{tot})$ and eq. (12) can be reformulated as eq. (13).

$$\eta_{lumped}(i_{106}, i_{107}, \beta, v_x, r, T_{tot}) = \frac{i_{106}\beta + i_{107}}{\frac{i_{106}\beta}{\eta_{106}\left(\frac{i_{106}v_x}{r}, \frac{\beta}{i_{106}\beta + i_{107}}T_{tot}\right)} + \frac{i_{107}}{\eta_{107}\left(\frac{i_{107}v_x}{r}, \frac{1}{i_{106}\beta + i_{107}}T_{tot}\right)}} \quad (13)$$

Hereby, the lumped efficiency module can transmit the signal 420 with information of the lumped efficiency value to the power management module 306. When the vehicle motion management system 200 thereafter receives a total torque request for the first 106 and second 107 electric machines at a current point in time, the motion coordination module 308 can allocate a power distribution for the electric machines 106, 107 based on the lumped efficiency value and the torque request. The above described signals 430 and 440 are then transmitted to the respective motion support devices 300', 300'' to control the respective electric machine 106, 107 based on the allocated power distribution.

Figure 4:
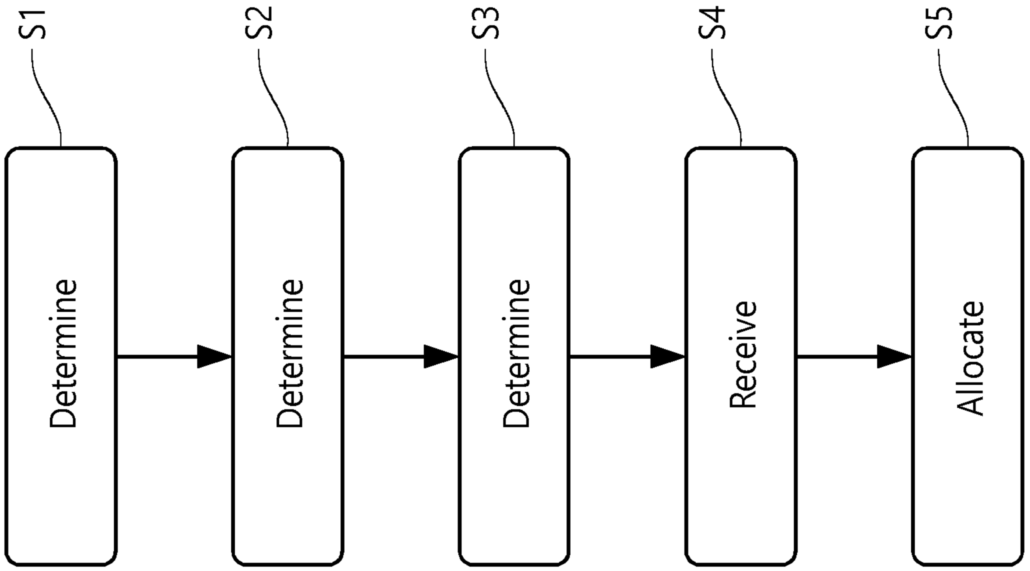
FIG. 4 is a flow chart of a method of controlling a vehicle propulsion system according to an example embodiment.

In order to sum up, reference is now made to FIG. 4, which is a flow chart of a method of controlling the above described vehicle propulsion system 101 according to an example embodiment. During operation, an aggregated mechanical power level $P_{m,tot}$ provided by the actuators, exemplified as the first 106 and second 107 electric machines of the first 300' and second 300'' motion support devices at the previous point in time is determined S1. The aggregated mechanical power level $T_{tot}$ is based on the actuator rotational speed $\omega_{106}$, $\omega_{107}$ and an actuator torque $T_{106}$, $T_{107}$ of the electric machines at the previous point in time.

Also, an aggregated electrical power level $P_{e,tot}$ provided by the electric machines 106, 107 of the first 300' and second 300'' motion support devices at the previous point in time is determined S2. The aggregated electrical power level is based on the actuator rotational speed $\omega_{106}$, $\omega_{107}$, the actuator torque $T_{106}$, $T_{107}$ and an efficiency $\eta_{106}$, $\eta_{107}$ of each electric machine 106, 107 at the previous point in time.

Based on the aggregated mechanical power level $P_{m,tot}$ at the previous point in time, the aggregated electrical power level $P_{e,tot}$ at the previous point in time, and an estimated actuator torque distribution B between the electric machines 106, 107, the lumped efficiency $\eta_{lumped}$ for the electric machines 106, 107 can be determined S3.

A total torque request for the electric machines 106, 107 at the current point in time is received S4 by the vehicle motion management system 200, whereby the power distribution for electric machines 106, 107 can be allocated S5 by the motion coordination module 308. The allocated torque distribution is based on the lumped efficiency value and the torque request, and the motion coordination module 308 transmits a control signal 430, 440 to the first 300' and second 300'' motion support devices, respectively for the motion support device to control operation of its electric machine.

It is to be understood that the present disclosure is not limited to the embodiments described above and illustrated in the drawings; rather, the skilled person will recognize that many changes and modifications may be made within the scope of the appended claims.

The invention claimed is:

1. A method of controlling a vehicle propulsion system comprising at least two motion support devices, wherein each motion support device comprises an actuator coupled to an energy storage system, each actuator being configured to receive electric power from the energy storage system when applying a torque on at least one wheel of a vehicle during propulsion and to feed electric power to the energy storage system when generating electric power during braking, each actuator having a maximum torque capability, the vehicle propulsion system further comprising processing circuitry coupled to each of the at least two motion support devices, the method comprising:

determining, by the processing circuitry, an aggregated mechanical power level provided by the actuators of the at least two motion support devices at a previous point in time, the aggregated mechanical power level being based on an actuator rotational speed and an actuator torque of each actuator at the previous point in time;

determining, by the processing circuitry, an aggregated electrical power level provided by the actuators of the at least two motion support devices at the previous point in time, the aggregated electrical power level being based on the actuator rotational speed, the actuator torque, and an efficiency of each actuator at the previous point in time;

determining, by the processing circuitry, a lumped efficiency value for the actuators of the at least two motion support devices, the lumped efficiency value being a total efficiency of the at least two actuators determined as a function of the aggregated mechanical power level at the previous point in time, the aggregated electrical power level at the previous point in time, and an estimated actuator torque distribution between the actuators of the at least two motion support devices at the previous point in time;

receiving, by the processing circuitry, a total torque request for the actuators of the at least two motion support devices at the current point in time;

determining, by the processing circuitry, a minimum and maximum power flow to/from the energy storage system to fulfil the total torque request of the actuators in response to the lumped efficiency value; and allocating, by the processing circuitry, a power distribution to/from the energy storage system for the actuators of the at least two motion support devices based on the torque request such that the estimated actuator torque distribution between the actuators is obtained, the power distribution being allocated to the actuators to not exceed the maximum torque capability for each of the actuators, and transmit a control signal to each of the at least two motion support devices to control the respective actuator based on the allocated power distribution.

2. The method of claim 1, wherein the estimated actuator torque distribution between the actuators of the at least two motion support devices is based on an aggregated actuator torque for the actuators of the at least two motion support devices at the previous point in time and a current vehicle speed.

3. The method of claim 1, wherein each of the motion support devices comprise a transmission receiving a torque from the actuator, the lumped efficiency being further based on a gear ratio provided by the transmission at the previous point in time.

4. The method of claim 1, wherein the efficiency of each actuator at the previous point in time is based on the actuator rotational speed and the actuator torque at the previous point in time.

5. The method of claim 1, wherein the aggregated mechanical power level and the aggregated electrical power level are generated by the actuators during braking.

6. The method according to claim 5, wherein the allocated power distribution is based on a current capability level of the energy storage system.

7. The method of claim 6, wherein at least one of the motion support devices comprise a foundation brake operable to apply a brake torque, the method further comprising:

comparing, by the processing circuitry, an electric power level generated by the actuators during braking with the current capability level of the energy storage system; and allocating, by the processing circuitry, the power distribution also to the foundation brake when the electric power level generated by the actuators exceeds the current capability level of the energy storage system.

8. A vehicle motion management system connectable to at least two motion support devices provided with an actuator coupled to an energy storage system, each actuator being configured to receive electric power from the energy storage system when applying a torque on at least one wheel of a vehicle during propulsion and to feed electric power to the energy storage system when generating electric power during braking, each actuator having a maximum torque capability, the motion management system being configured to:

receive a signal indicative of an aggregated mechanical power level provided by the actuators of the at least two motion support devices at a previous point in time, the aggregated mechanical power level being based on an actuator rotational speed and an actuator torque of each actuator at the previous point in time;

receive a signal indicative of an aggregated electrical power level provided by the actuators of the at least two motion support devices at the previous point in time, the aggregated electrical power level being based on the actuator rotational speed, the actuator torque, and an efficiency of each actuator at the previous point in time;

determine a lumped efficiency value for the actuators of the at least two motion support devices, the lumped efficiency value being a total efficiency of the at least two actuators determined as a function of the aggregated mechanical power level at the previous point in time and, the aggregated electrical power level at the previous point in time, and an estimated actuator torque distribution between the actuators of the at least two motion support devices at the previous point in time;

receive a signal indicative of a total torque request for the actuators of the at least two motion support devices at the current point in time;

determine a minimum and maximum power flow to/from the energy storage system to fulfil the total torque request of the actuators in response to the lumped efficiency value; and allocate a power distribution to/from the energy storage system for the actuators of the at least two motion support devices based on the torque request such that the estimated actuator torque distribution between the actuators is obtained, the power distribution being allocated to the actuators to not exceed the maximum torque capability for each of the actuators and transmit a control signal to each of the at least two motion support devices to control the respective actuator based on the allocated power distribution.

9. A vehicle comprising the vehicle motion management system of claim 8.

* * * * *